(12) United States Patent
Kawaguchi

(10) Patent No.: US 6,293,682 B1
(45) Date of Patent: Sep. 25, 2001

(54) REFLECTING PANEL ADJUSTING MECHANISM

(75) Inventor: Noboru Kawaguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/685,062

(22) Filed: Oct. 10, 2000

(30) Foreign Application Priority Data

Apr. 13, 2000 (JP) .................................... 12-112055

(51) Int. Cl.$^7$ .................................... G02B 7/182
(52) U.S. Cl. .................... 359/871; 359/872; 359/873; 359/846; 359/847; 359/848
(58) Field of Search .................... 359/871, 872, 359/873, 874, 875, 877, 220, 221, 222, 223, 224, 225, 226, 846, 847, 848, 849

(56) References Cited

U.S. PATENT DOCUMENTS

| 4,632,523 | * | 12/1986 | Knohl | .................................... 350/611 |
| 5,035,497 | * | 7/1991 | Itoh | .................................... 350/611 |
| 5,411,617 | * | 5/1995 | La Fiandra | .................................... 156/154 |
| 5,642,237 | | 6/1997 | Miyawaki et al. . | |
| 5,831,780 | * | 11/1998 | Krim | .................................... 359/846 |

* cited by examiner

Primary Examiner—Mohammad Sikder
(74) Attorney, Agent, or Firm—Oblon, Spivak, McClelland, Maier & Neustadt, P.C.

(57) ABSTRACT

A reflecting panel adjusting mechanism includes a support means for supporting a reflecting panel 1 at three points through spherical bearing units (7a, 7b and 7c) rotatable in all directions on axes (6a, 6b and 6c) turning only in the radial direction, the support means having turning arms (8a, 8b and 8c), etc; and jacks (9a, 9b and 9c) for moving the turning axes of the support means vertically; wherein inclination and height of the reflecting panel are adjusted.

5 Claims, 7 Drawing Sheets

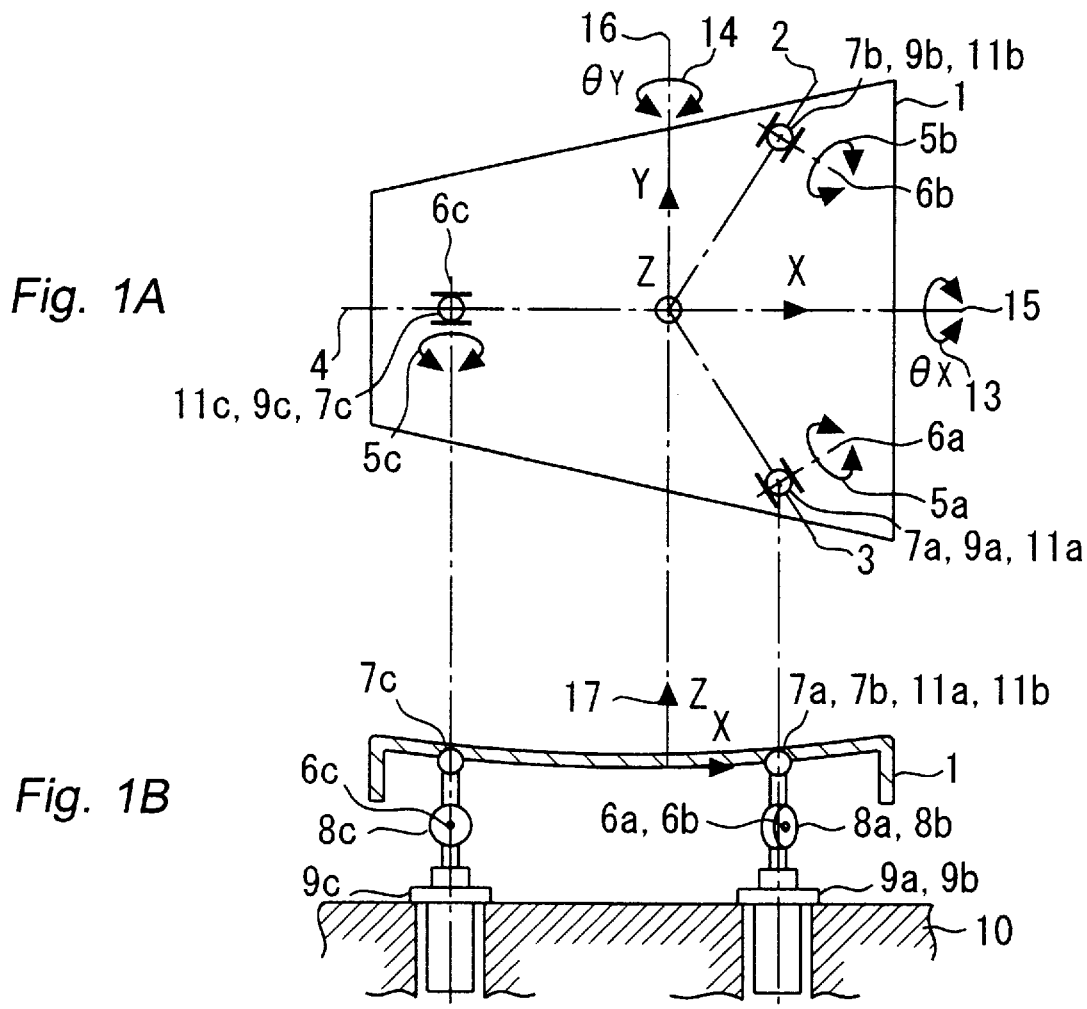
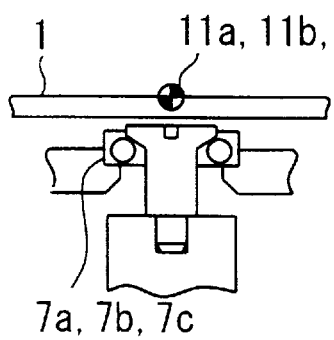 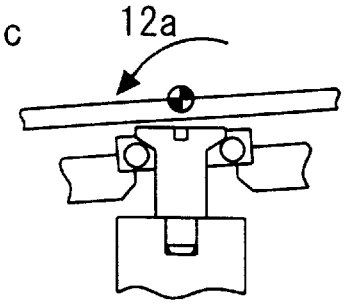 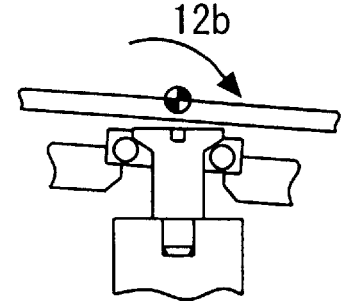

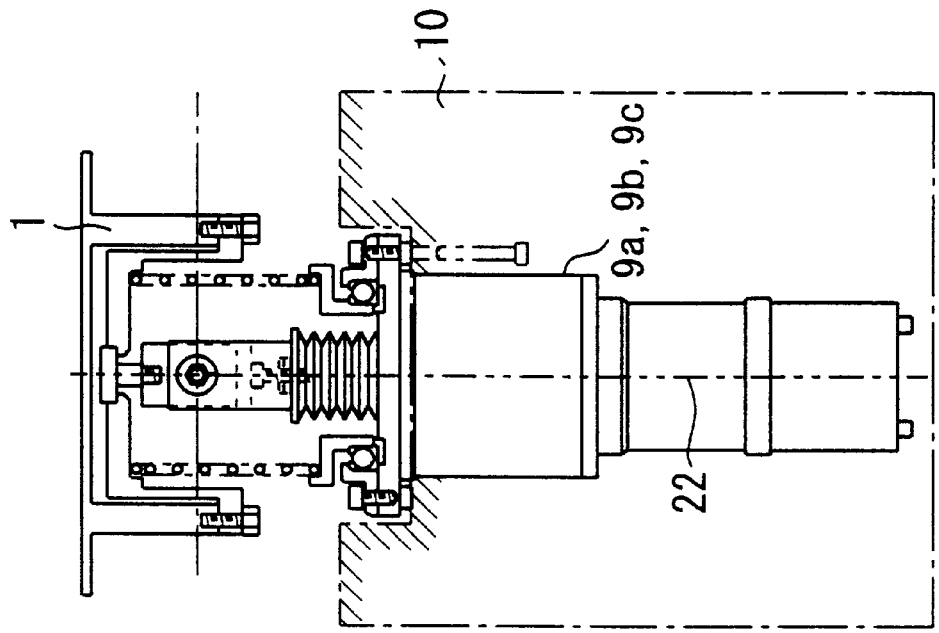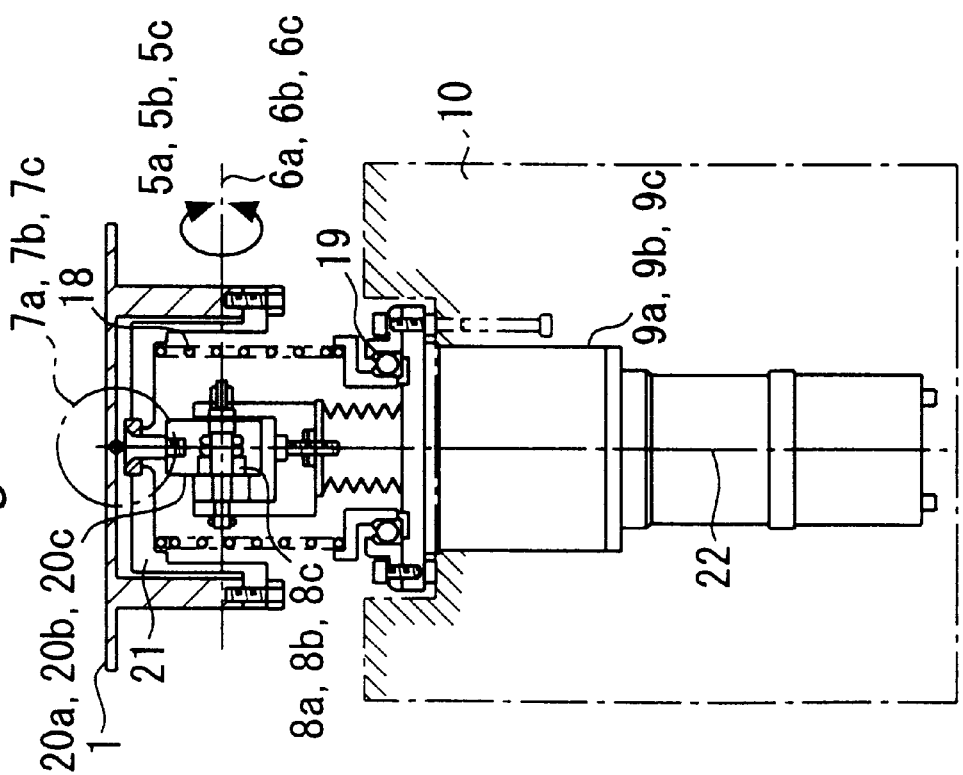

REFLECTING PANEL ADJUSTING MECHANISM

BACKGROUND OF THE INVENTION

1. Field of the Invention

The present invention relates to an active support mechanism for supporting a thin reflecting panel included in, for example, a radio telescope and, more particularly, to a reflecting panel adjusting mechanism capable of adjusting the inclination and height of a thin, lightweight reflecting panel without adversely affecting the accuracy of the reflecting panel and of absorbing the thermal distortion of the reflecting panel without forcibly restraining the reflecting panel from moving.

2. Description of the Background Art

FIG. 8A is a schematic plan view of a conventional reflecting panel adjusting mechanism. FIG. 8B is a sectional view taken on a line passing parts 35a and 36 in FIG. 8A. FIG. 8C is a schematic sectional view taken on a vertical line passing a part 34. The reflecting panel adjusting mechanism supports a reflecting panel at four points on two thin, leaf springs, one rod spring and a fixed member.

Shown in FIGS. 8A, 8B and 8C are a reflecting panel 1, a fixed point 34 for restraining the reflecting panel 1 from movement in a horizontal plane and from rotation, holding points 35a and 35b of leaf springs for absorbing the thermal distortion of the reflecting panel 1 in the directions of the arrows 46 and 47, respectively. The leaf spring provided at the holding point 35b has a low rigidity with respect to the directions of the arrows 39 and a high rigidity with respect to the directions of the arrows 40.

Reference numeral 36 denotes a rod spring as a supporting portion that absorbs the thermal distortion of the reflecting panel 1 in all directions including the direction of the arrow 48. The rod spring 36 has a low rigidity with respect to directions indicated by the arrows 41 and 42. Reference numeral 9 denotes jacks for adjusting the inclination and height of the reflecting panel 1.

Reference numeral 44 denotes a leaf spring. The leaf spring 44 is easy to bend in the directions of the arrow 37, and the same is difficult to bend in the directions of the arrow 38. Reference numeral 45 denotes a large-diameter rigid rod for fixation.

When adjusting the height of the reflecting panel 1, the jacks 9 are operated simultaneously to move the reflecting panel 1 vertically. When adjusting the inclination of the reflecting panel 1, jacks 9 are extended or contracted according to necessity. A spherical washer 49 is interposed between the jack 9 and the leaf spring 44 to enable the leaf spring 44 to tilt. In this time, the springs are distorted to absorb a change in the inclination of the reflecting panel 1 and changes in distances between the support points.

The reflecting panel 1 makes thermal expansion in the directions of the arrows 46, 47 and 48 from the fixed point 34 to relieve thermal stress induced therein by thermal distortion. Since the reflecting panel 1 is supported by the springs having a low rigidity with respect to those directions, the reflecting panel 1 is able to make uniform thermal expansion without being significantly distorted. Therefore, the accuracy of the reflecting mirror surface is not significantly deteriorated.

When adjusting the inclination of the reflecting panel by the reflecting panel adjusting mechanism thus constructed, the reflecting panel is distorted by the reactive forces of the distorted leaf springs and the rod spring if the reflecting panel is very thin and lightweight and is required to have a high accuracy, whereby the accuracy of the reflecting mirror surface is deteriorated.

Similarly to the case of relieving thermal stress, if the reflecting panel is thin and lightweight and has a low rigidity susceptible to the rigidities at the support points, the thermal distortion of the reflecting panel cannot be properly absorbed and the accuracy of the reflecting mirror surface is deteriorated.

SUMMARY OF THE INVENTION

The present invention has been made to solve the foregoing problems and it is therefore an object of the present invention to provide a reflecting panel adjusting mechanism capable of tilting a precision, thin, lightweight reflecting panel without exerting detrimental forces from support points to the reflecting panel and of maintaining the accuracy of the mirror surfaces of the reflecting panel.

Another object of the present invention is to provide a reflecting panel adjusting mechanism capable of relieving thermal stress induced in a reflecting panel due to the thermal distortion thereof, of allowing the reflecting panel to move as a rigid body when the same is distorted by heat, of preventing the action of reactive forces of the supports on the reflecting panel and of keeping the accuracy of the mirror surface of the reflecting panel unchanged.

The above objects of the present invention are achieved by a reflecting panel adjusting mechanism described below. The mechanism includes a support device for supporting a reflecting panel at three points through spherical bearings. Each of the spherical bearings is rotatable in all directions and provided on turning axes each of which turns only in a certain direction. The mechanism also includes an adjusting device for moving the turning axes of the support device vertically so as to adjust inclination and height of the reflecting panel.

The above objects of the present invention are achieved by a reflecting panel adjusting mechanism described below. The mechanism includes a support device for supporting a reflecting panel at four points so that the reflecting panel is able to turn in all directions. The mechanism also includes an adjusting device for vertically moving the support device. One of the four points corresponding to a center of the reflecting panel is kept stationary while the other three points are moved vertically by the adjusting device when adjusting the inclination of the reflecting panel. The four points are moved simultaneously vertically by the adjusting device when adjusting the height of the reflecting panel.

Other objects and further features of the present invention will be apparent from the following detailed description when read in conjunction with the accompanying drawings.

BRIEF DESCRIPTION OF THE DRAWINGS

FIGS. 1A and 1B are, schematic plan views of a reflecting panel adjusting mechanism in a first embodiment according to the present invention;

FIGS. 2A through 2C are schematic views of assistance in explaining that the position of the center of tilting motion of a reflecting panel corresponds to the surface of the panel in the first embodiment;

FIGS. 3A and 3B are front elevations of an essential part of the reflecting panel adjusting mechanism in the first embodiment;

DESCRIPTION OF THE PREFERRED EMBODIMENTS

Figures 4A, 4B:
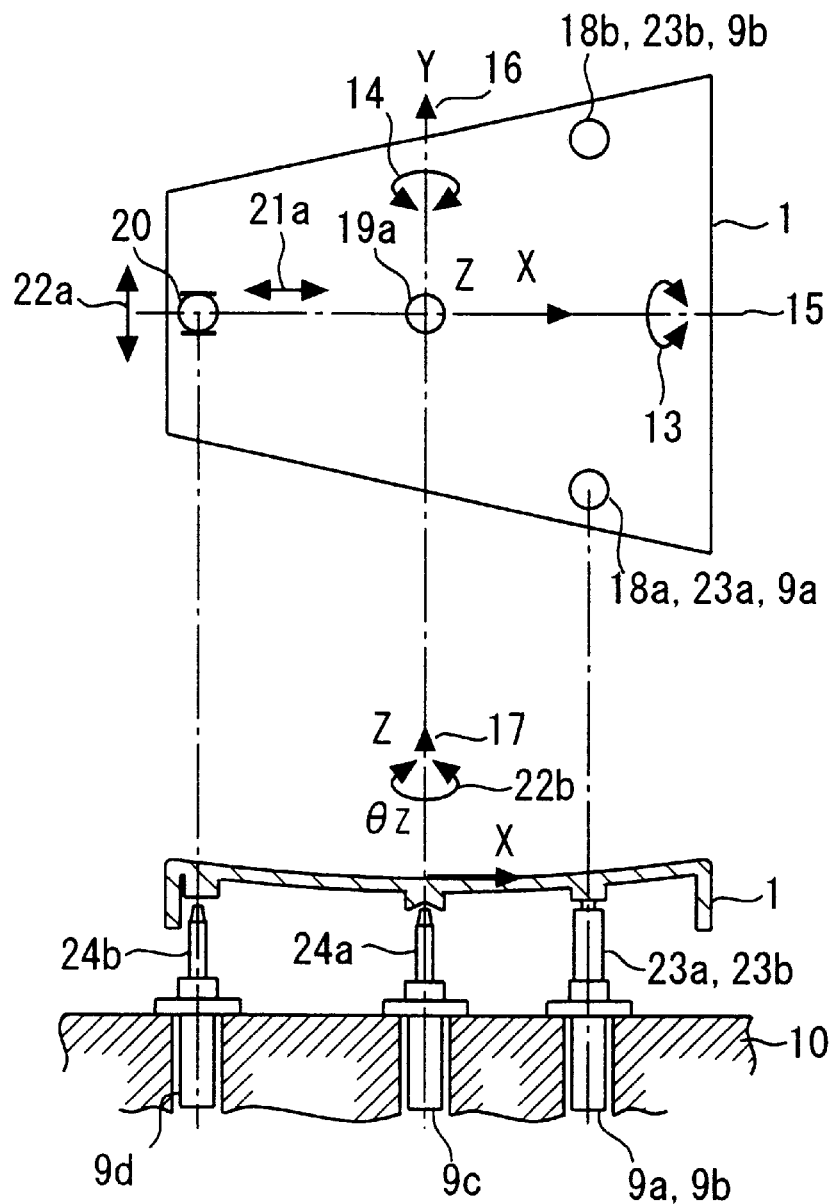
FIGS. 4A and 4B are a schematic plan view and a schematic sectional view, respectively, of a reflecting panel adjusting mechanism in a second embodiment according to the present invention.

In the following, principles and embodiments of the present invention will be described with reference to the accompanying drawings.

First Embodiment

FIGS. 1A and 1B are a plan view and a sectional view, respectively, of a reflecting panel adjusting mechanism in a first embodiment according to the present invention. FIGS. 2A thorough 2C are schematic views of assistance in explaining that a position of the center of tilting motion of the reflecting panel is provided on the surface of the panel in the first embodiment. FIGS. 3A and 3B are apartly sectional front elevation and a side elevation, respectively, of a turning axis and a spherical bearing unit included in the reflecting panel adjusting mechanism in the first embodiment.

Shown in FIGS. 1 to 3 are a reflecting panel 1, turning axes 6a, 6b and 6c, and spherical bearing units 7a, 7b and 7c capable of turning about axes so that turning centers 11a, 11b and 11c are on a reflecting mirror surface of the reflecting panel 1. The spherical bearing units 7a, 7b and 7c support frames 21 holding the reflecting panel 1 thereon. Shown also in FIGS. 1 to 3 are turning bearing units 8a, 8b and 8c provided with bearings respectively having inclined turning axes to move the spherical bearing units 7a, 7b and 7c along lines 2, 3 and 4, jacks (screw jacks) 9a, 9b and 9c, i.e., adjusting device, for vertically moving the reflecting panel 1. The spherical bearing units 7a, 7b and 7c and turning arms 20a, 20b and 20c are supported on the jacks 9a, 9b and 9c, respectively. The jacks 9a, 9b and 9c are held fixedly on a bed 10.

Springs 18, i.e., elastic members, eliminate axial backlashes, mainly backlashes in the spherical bearing units 7a, 7b and 7c and in the jacks 9a, 9b and 9c, of the reflecting panel adjusting mechanism. Each of bearings 19 relieves a reactive force resulting from the turning of the frame 21 about the center axis 22 of the jack 9a, 9b and 9c. Practically, the bearing 19 is a self-aligning bearing placed on a spring retainer for retaining the spring 18. The spherical bearing units 7a, 7b and 7c are supported on turning arms 20a, 20b and 20c, respectively. The turning arms 20a, 20b and 20c are fixed to a shaft turnable only about the turning axes 6a, 6b and 6c respectively. The shaft turnable about the turning axes 6a, 6b and 6c, the spherical bearing units 7a, 7b and 7c, the turning bearing units 8a, 8b and 8c and the turning arms 20a, 20b and 20c constitute a support device.

The operation of the reflecting panel adjusting mechanism will be described hereinafter. The thin, lightweight reflecting panel 1 has a precision mirror surface. The reflecting panel 1 is expected to be distorted by a slight external force. The operation will be described on an assumption that the inclination of the reflecting panel 1 is adjusted.

First the reflecting panel 1 is turned in the direction of the arrow 14 about a Y-axis 16 through an angle θy. The jacks 9a and 9b are extended or shortened vertically by the same length and, consequently, the turning arms 20a and 20b and the spherical bearing units 7a and 7b are moved accordingly. The positions of the spherical bearing units 7a and 7b on the reflecting panel 1 is fixed and the spherical bearing units 7a and 7b are unmovable on the reflecting panel 1.

Since the turning arms 20a and 20b are able to turn only in the radial directions of the arrows 5a and 5b, the turning centers 11a and 11b of the spherical bearing units 7a and 7b are able to move only in the vertical direction of the arrow 17 parallel to a Z-axis 17.

As shown in FIG. 2B, the inclination of the reflecting panel 1 makes the same to be turned in the direction of the arrow 12a because the spherical bearing units 7a and 7b are turnable in any directions. Even if the reflecting panel 1 is turned, the reflecting panel 1 can be restrained from moving in a plane defined by an X-axis 15 and the Y-axis 16 because the turning centers of the spherical bearing units 7a and 7b are on the surface of the reflecting panel 1.

The reflecting panel 1 turns on the turning centers 11a and 11b of the spherical bearing units 7a and 7b. Since the turning centers 11a and 11b of the spherical bearing units 7a and 7b are able to move only in vertical directions, the turning center 11c of the spherical bearing unit 7c moves necessarily in a direction parallel to the X-axis 15; otherwise a tensile force acts on the reflecting panel 1 to cause a detrimental distortion of the reflecting panel 1. However, the turning arm 20c turns about the turning axis 6c in the direction of the arrow 5c, i.e., toward the Z-axis 17, so that the turning center 11c of the spherical bearing unit 7c approaches the turning centers 11a and 11b.

The spherical bearing unit 7c capable of turning about the turning center 11c allows the reflecting panel 1 to turn in the direction of the arrow 12a shown in FIG. 2, without causing any detrimental distortion of the reflecting panel 1. Thus, the reflecting panel 1 is shifted slightly rightward, as viewed in FIGS. 1A and 1B (rightward direction with respect to point 0 in the X-axis), in parallel to the X-axis 15 in a rigid body and is turned about the Y-axis 16 in the direction of the arrow 14 for inclination adjustment. Any force that cause a detrimental distortion does not act on the reflecting panel 1 while the same is thus shifted and turned.

Next, explanation will be given of the operation in which the reflecting panel 1 is turned about the X-axis 15 through an angle θx in the direction of the arrow 13. First one of the jacks 9a and 9b is extended and the other is shortened. When viewed from the z-axis 17, the turning centers 11a and 11b of the spherical bearing units 7a and 7b are shifted geometrically toward each other in parallel to the Y-axis 16. Since the turning centers 11a and 11b of the spherical bearing units 7a and 7b are able to move only along the lines 2 and 3, respectively, the turning centers 11a and 11b are shifted necessarily along the lines 2 and 3, respectively.

Consequently, the reflecting panel 1 is shifted slightly leftward, as viewed in FIGS. 1A and 1B (rightward direction with respect to point 0 in the X-axis), in parallel to the X-axis 15 in a solid body and is turned about the X-axis in the direction of the arrow 13. In this state, the turning center 11a must be shifted to the left, as viewed in FIGS. 1A and 1B in parallel to the X-axis 15; otherwise a force acts on the reflecting panel 1 to cause a detrimental distortion of the reflecting panel 1. Since the turning arm 20c turns about the turning axis 6c in the direction of the arrow 5c to move the turning center 11c of the spherical bearing unit 7c leftward, as viewed in FIGS. 1A and 1B in parallel to the X-axis. As shown in FIG. 2C, the spherical bearing unit 7c capable of turning about the turning center 11c allows the reflecting panel 1 to turn in the direction of the arrow 12b without causing any detrimental distortion of the reflecting panel 1.

Consequently, the reflecting panel 1 is shifted slightly leftward, as viewed in FIGS. 1A and 1B, along the X-axis 15 in a solid body and is turned about the X-axis 15 in the direction of the arrow 13, in which any force that causes a detrimental distortion of the reflecting panel 1 does not act on the same. When adjusting the height of the reflecting panel 1 in parallel all the jacks 9a, 9b and 9c are extended or shortened simultaneously by the same length.

The thermal distortion of the reflecting panel 1 can be prevented by absorbing the local thermal expansion of the reflecting panel 1 by the same mechanism as that mentioned above.

The reflecting panel adjusting mechanism in the first embodiment is capable of adjusting the inclination and the height of the reflecting panel by supporting the reflecting panel 1 on the spherical bearing units supported on the arms capable of turning only about the specific turning axes, respectively, at the three supporting points to restrict two degrees of freedom with respect to circumferential directions and vertical directions at each supporting point and to restrict six degrees of freedom by the three supporting points, and by moving the arms capable of turning only about the specific turning axes vertically by the jacks.

Thus the inclination of the reflecting panel can be adjusted without exerting excessive reactive forces on the reflecting panel and the reflecting panel can be moved in a solid body while maintaining the accuracy of the mirror surface of the reflecting panel. Similarly, the thermal expansion of the reflecting panel can be absorbed without inducing thermal stress in the mirror surface to avoid the thermal distortion of the reflecting panel; that is, the inclination of the reflecting panel can be adjusted, causing only the movement of the reflecting panel in a solid body without causing any detrimental distortion of the reflecting panel. Moment of force generated by the thermal distortion of the reflecting panel can be absorbed by the supports thereof and the thermal expansion of the reflecting panel can be absorbed so that any thermal stress may not be induced in the reflecting panel.

Second Embodiment

Figure 5:
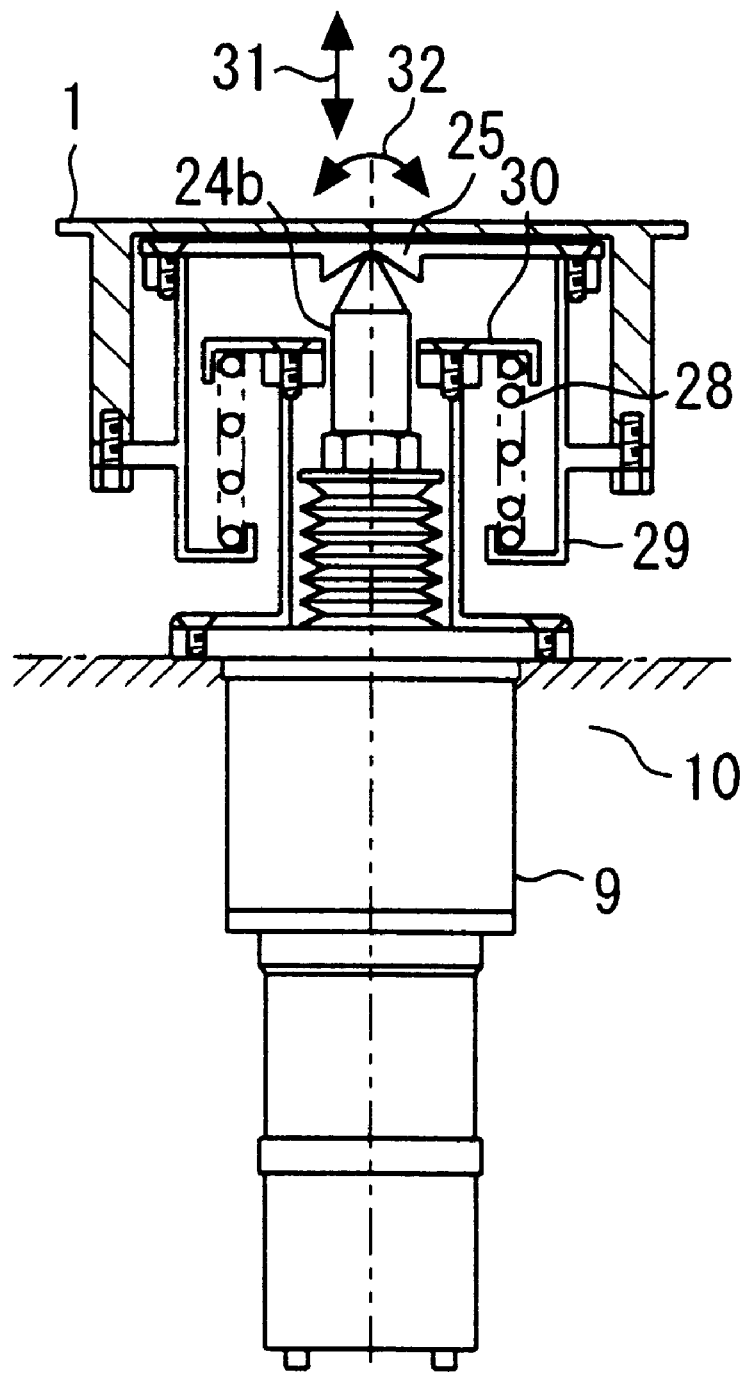
FIGS. 5 through 7 are front elevations of an essential part of the reflecting panel adjusting mechanism in the second embodiment.
Figure 6:
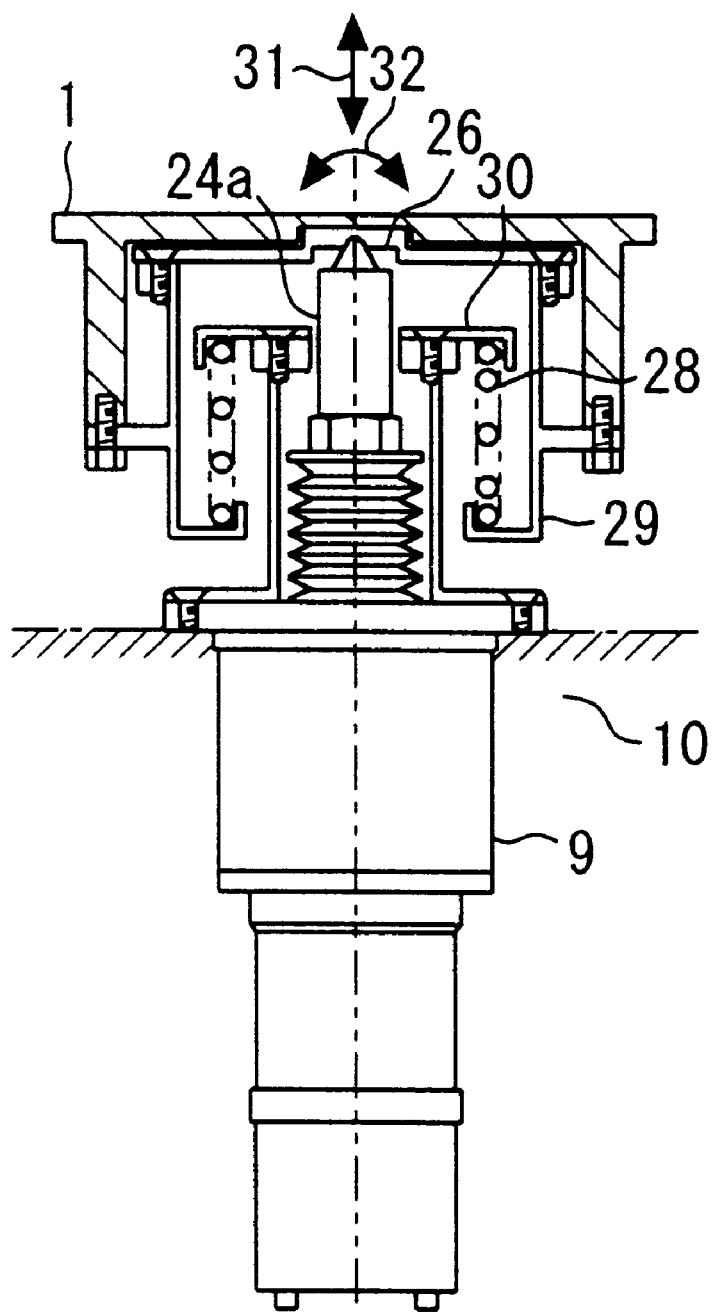
Figure 7:
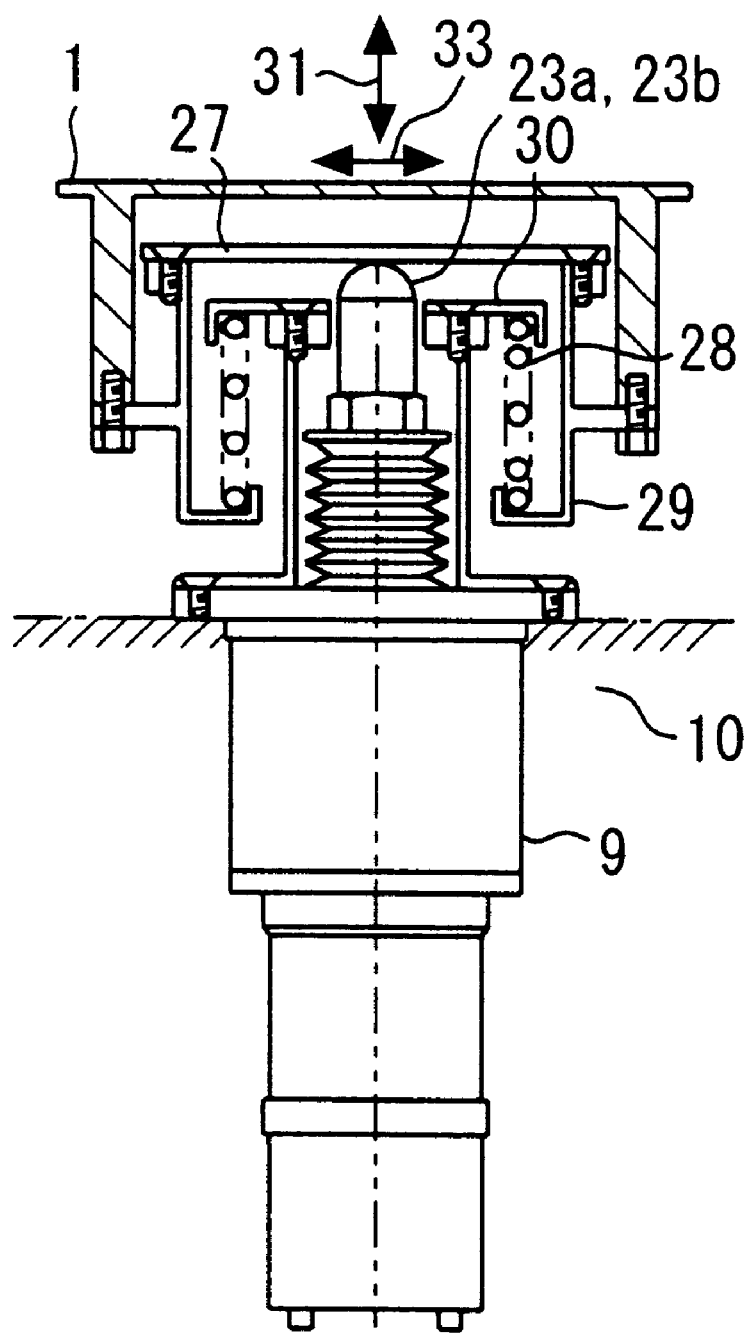
Figure 8C:
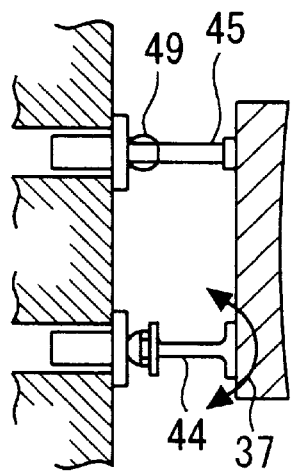
FIG. 8 is as schematic plan view of a conventional reflecting panel adjusting mechanism.
Figure 8A:
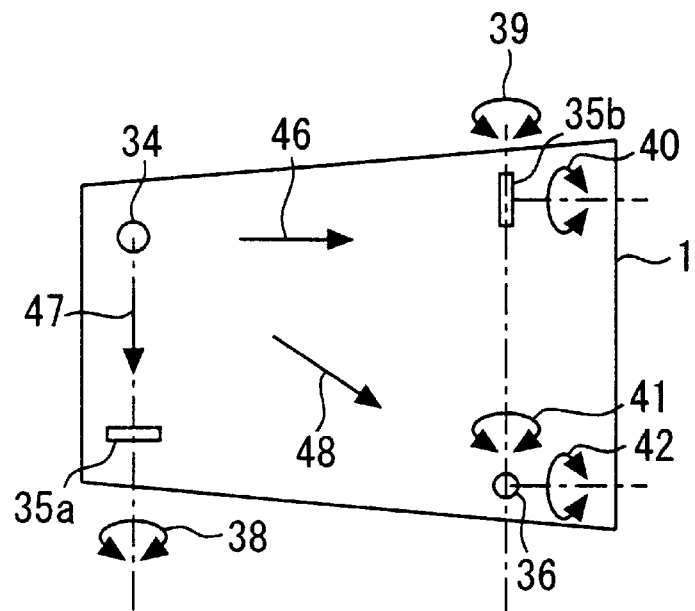
Figure 8B:
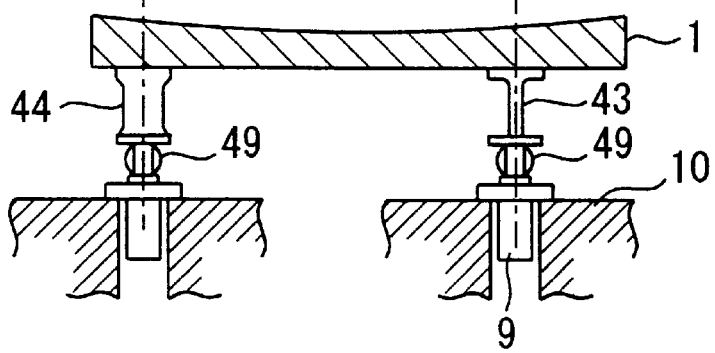

FIGS. 4A and 4B are a schematic plan view and a schematic sectional view, respectively, of a reflecting panel adjusting mechanism in a second embodiment according to the present invention. FIGS. 5 to 7 are enlarged sectional views of essential parts of the reflecting panel adjusting mechanism shown in FIGS. 4A and 4B, in which parts like or corresponding to those shown in FIGS. 1 to 3 are denoted by the same reference characters and the description thereof will be omitted.

While in the case where the reflecting panel 1 supported at the three points is shown in the first embodiment, the reflecting panel adjusting mechanism in the second embodiment supports a reflecting panel 11a at four points. The inclination and the height of the reflecting panel 1 supported at the four points can be adjusted without causing any detrimental distortion of the reflecting panel 1.

Referring to FIGS. 4 to 7, there are shown spherical sliding supports 18a and 18b, a fixed XY support 19a and a fixed turning support 20. The fixed turning support 20 restrains the reflecting panel 1 from turning about a Z-axis 17. A first round-pointed support rod 23a and a second round-pointed support rod 23b have spherical tips, respectively. The round-pointed support rods 23a and 23b are able to slide in an XY plane defined by an X-axis and a Y-axis and allow the reflecting panel to be inclined.

A first sharp-pointed support rod 24a restrains the center of the reflecting panel 1 from movement along the X-axis, the Y-axis and a Z-axis. The sharp-pointed support rod 24a allows the reflecting panel 1 to turn thereon about the X-axis, the Y-axis and the Z-axis.

A sharp-second pointed support rod 24b restrains the reflecting panel 1 from turning about the Z-axis 17 through an angle θz in the directions of the arrows 22b. The reflecting panel 1 is provided with a groove to guide the second sharp-pointed support rod 24b for movement relative to the reflecting panel 1 in the directions of the arrows 21a. The reflecting panel 1 is restrained from turning in the directions of the arrows 22a and is allowed to move in the directions of the arrows 21a. The round-pointed support rods 23a and 23b and the sharp-pointed support rods 24a and 24b constitute a support device.

A V-groove 25 (FIG. 5) restrains the panel 1 from turning about the Z-axis 17. A fixed cone-shaped support 26 (FIG. 6) restrains the reflecting panel 1 from movement along the X-axis 15, the Y-axis 16 and the Z-axis 17. A flat support 27 (FIG. 7) allows the reflecting panel 1 to slide in directions parallel to the X-axis 15 and the Y-axis 16, and restrains the same from movement in directions parallel to the Z-axis 17.

Springs 28, i.e., elastic members, are placed between support members 29 and 30 to support the panel 1 on the jacks 9 so that backlashes in the direction of the arrow 31 are eliminated. The reflecting panel 1 is able to move in the directions of the arrows 32 and 33.

The operation of the reflecting panel adjusting mechanism will be described hereinafter. When turning the reflecting panel 1 about the Y-axis 16 in the direction of the arrow 14, the jacks 9a, 9b and 9d are extended or shortened properly so that the reflecting panel 1 is turned on the fixed XY support 19a. The reflecting panel 1 turns on and slides relative to the round-pointed support rods 23a and 23b and the sharp-pointed support rod 24b. Therefore, the inclination of the reflecting panel 1 can be adjusted without causing any detrimental distortion of the reflecting panel 1. When turning the reflecting panel 1 about the X-axis 15 in the direction of the arrow 13, the jack 9a and 9b are extended or shortened properly.

The reflecting panel 1 turns on and slides in a direction parallel to the Y-axis 16 relative to the round-pointed support rods 23a and 23b. Therefore, the reflecting panel 1 can be turned about the X-axis 15 without causing any detrimental distortion of the reflecting plate 1.

When adjusting the height of the reflecting panel 1, the four jacks 9a, 9b, 9c and 9d are extended or shortened simultaneously by the same length.

The reflecting plate 1 is restrained from movement in directions along the X-axis 15 by the fixed XY support 19a. The reflecting plate 1 thus supported is able to make thermal expansion.

The reflecting panel adjusting mechanism in the second embodiment is capable of adjusting the inclination and the height of the reflecting panel by supporting the reflecting panel at four points, i.e., supporting the central point of the reflecting panel coinciding with the center of gravity of the reflecting panel on the sharp-pointed support rod so that the reflecting panel is restrained from movement in directions parallel to the X-axis, the Y-axis and the Z-axis and is allowed to turn in all directions, and supporting the other three points so that the reflecting panel is able to turn about the X-axis, the Y-axis and the Z-axis through angles θx, θy and θz. When adjusting the inclination of the reflecting panel, the central support point is held stationary and the other three support points are moved vertically. When adjusting the height of the reflecting panel, all the four support points are moved vertically simultaneously. Thus, the second embodiment exercises the same effect as that of the first embodiment.

The major benefits of the present invention described above are summarized as follows:

According to a first aspect of the present invention, a reflecting panel adjusting mechanism comprising: a support device for supporting a reflecting panel at three points through spherical bearings rotatable in all directions provided on turning axes each of which turns only in a certain direction; and an adjusting device for moving the turning axes of the support device vertically; wherein inclination and height of the reflecting panel are adjusted. Accordingly, the reflecting panel adjusting mechanism is capable of adjusting both the inclination and the height of the reflecting panel maintaining the accuracy of the mirror surface of the reflecting panel without exerting excessive reactive forces on the reflecting panel so that the reflecting panel moves in a rigid body. When the reflecting panel is subjected to thermal distortion, the thermal expansion of the reflecting panel can be absorbed without inducing thermal stress in the mirror surface. Thus, precision adjustment can be achieved.

According to a second aspect of the present invention, the support device has at least a turning arm to support the spherical bearing, and the turning axis is provided to the turning arm. This arrangement prevents the detrimental distortion of the reflecting panel.

According to a third aspect of the present invention, the turning center of each spherical bearing lies on a surface of the reflecting panel. This arrangement enables turning the reflecting panel without causing any detrimental distortion of the reflecting panel.

According to a fourth aspect of the present invention, the adjusting device includes jacks each supporting the turning arm to which the turning axis of the support device is provided. This arrangement enables precision, efficient adjustment.

According to a fifth aspect of the present invention, elastic members are extended axially between the adjusting device and the reflecting panel. This arrangement eliminates axial backlashes in the reflecting panel adjusting mechanism, particularly, backlashes between the spherical bearings and the jacks.

According to a sixth aspect of the present invention, a self-aligning bearing is combined with a retaining member for retaining the elastic member. The self-aligning member relieves a reactive force resulting when a twisting force is exerted on the elastic member in turning the reflecting panel about the center axis of the corresponding jack.

According to a seventh aspect of the present invention, a reflecting panel adjusting mechanism comprising: a support device for supporting a reflecting panel at four points so that the reflecting panel is able to turn in all directions; and an adjusting device for vertically moving the support device; wherein one of the four points corresponding to a center of the reflecting panel is kept stationary and the other three points are moved vertically by the adjusting device when adjusting the inclination of the reflecting panel, and the four points are moved simultaneously vertically by the adjusting device when adjusting the height of the reflecting panel. Accordingly, the reflecting panel adjusting mechanism is capable of adjusting both the inclination and the height of the reflecting panel maintaining the accuracy of the mirror surface of the reflecting panel without exerting excessive reactive forces on the reflecting panel so that the reflecting panel moves in a rigid body. When the reflecting panel is subjected to thermal distortion, the thermal expansion of the reflecting panel can be absorbed without inducing thermal stress in the mirror surface. Thus, precision adjustment can be achieved.

According to an eighth aspect of the present invention, one of the four points of the support device supports a central part of the reflecting panel so as to restrain the reflecting panel from moving in directions parallel to an X-axis, a Y-axis and a Z-axis and to allow the reflecting panel to turn about the X-axis, the Y-axis and the Z-axis, and the other three points supports the reflecting panel so that the reflecting panel is able to turn about the X-axis, the Y-axis and the Z-axis. This arrangement enables precision, efficient adjustment.

According to a ninth aspect of the present invention, the two points among the other three points restrain the reflecting panel from movement only in directions parallel to the Z-axis, and the one point among the other three points allows the reflecting panel to slide only in opposite directions parallel to a V-groove. This arrangement enables precision, efficient adjustment.

According to a tenth aspect of the present invention, the support device comprises a first sharp-pointed support rod supporting the central part of the reflecting panel, first and second round-pointed support rods that restrains the reflecting panel from movement in directions parallel to the Z-axis and allows the reflecting panel to slide thereon, and a second sharp-pointed support rod that allows the reflecting panel to slide in directions parallel to the V-groove. This arrangement enables the movement of the reflecting panel in a solid body and the free thermal expansion of the reflecting panel with reliability and precision, efficient adjustment.

According to an eleventh aspect of the present invention, the adjusting device has jacks connected to the four points of the support device. This arrangement enables precision, efficient adjustment.

According to a twelfth aspect of the present invention, elastic members respectively retained by retaining members are interposed between the adjusting device and the reflecting panel. This arrangement eliminates backlashes between the reflecting plate and the jacks and enables precision, efficient adjustment.

Further, the present invention is not limited to these embodiments, but variations and modifications may be made without departing from the scope of the present invention.

The entire disclosure of Japanese Patent Application No. 2000-112055 filed on Apr. 13, 2000 including specification, claims, drawings and summary are incorporated herein by reference in its entirety.

What is claimed is:

1. A reflecting panel adjusting mechanism comprising: a support means for supporting a reflecting panel at three points through spherical bearings rotatable in all directions provided on turning axes each of which turn only in a certain direction; and an adjusting means for moving the turning axes of the support means vertically so as to adjust inclination and height of the reflecting panel, wherein elastic members are extending axially between the adjusting means and the reflecting panel.

2. The reflecting panel adjusting mechanism according to claim 1, wherein the support means has at least a turning arm to support the spherical bearing, and the turning axis is provided to the turning arm.

3. The reflecting panel adjusting mechanism according to claim 2, wherein the turning center of each spherical bearing lies on a surface of the reflecting panel.

4. The reflecting panel adjusting mechanism according to claim 2, wherein the adjusting means includes jacks each supporting the turning arm to which the turning axis of the support means is provided.

5. The reflecting panel adjusting mechanism according to claim 5, wherein a self-aligning bearing is combined with a retaining member for retaining the elastic member.

* * * * *

UNITED STATES PATENT AND TRADEMARK OFFICE
CERTIFICATE OF CORRECTION

PATENT NO. : 6,293,682 B1
DATED : September 25, 2001
INVENTOR(S) : Noboru Kawaguchi Page 1 of 1

It is certified that error appears in the above-identified patent and that said Letters Patent is hereby corrected as shown below:

<u>Column 8,</u>
Line 64, delete "claim 5", and insert -- claim 1 --.

Signed and Sealed this

Fourteenth Day of May, 2002

Attest:

*Attesting Officer*

JAMES E. ROGAN
*Director of the United States Patent and Trademark Office*